Sept. 16, 1958 J. B. KUIPERS 2,851,886
DAMPING MEANS FOR A RATE GYROSCOPE
Filed Oct. 24, 1955

Axis of Gimbal

INVENTOR.
Jack B. Kuipers
BY
Attorney

United States Patent Office 2,851,886
Patented Sept. 16, 1958

2,851,886

DAMPING MEANS FOR A RATE GYROSCOPE

Jack B. Kuipers, Grand Rapids, Mich., assignor to Lear, Incorporated, Grand Rapids, Mich., a corporation of Illinois Application October 24, 1955, Serial No. 542,433

3 Claims. (Cl. 74—5.5)

This invention relates to improvements in damping means for gyroscopes. More particularly it has reference to means for damping short term oscillations of a rate gyroscope, sometimes referred to as rate damping.

In various types of aircraft instruments wherein rate of turn of the craft is to be sensed and an electrical or other signal proportional thereto utilized for controlling the direction and/or attitude of flight it is more or less standard practice to utilize a so-called rate gyroscope having only one degree of freedom, resiliently constrained about that axis of freedom and having pickoff means which will provide the desired electrical signal. However, when the craft is in a defined flight path it is subject to departures from its defined course due to rough air. Under these conditions the aircraft can oscillate in yaw attitude over a range as high as ±3°. It is therefore desirable to smooth or integrate the displacement of the gyroscope to render the controlled equipment insensitive to these minor fluctuations, which may also be superimposed on the path of a true turn.

Thus it has been customary to include some form of viscous damping which acts to dissipate these low order oscillations of the gyroscope, for example, a conventional dashpot. However, it has been found that the solution is not that straightforward when attempted in connection with the rate gyroscope presently being incorporated in rate-of-turn instruments. Recently such rate gyroscopes have taken increasingly smaller size and, with such decrease, the provision of viscous damping means has become more of a problem principally because of space limitations. Where a conventional dashpot arrangement is employed the dimensions thereof and accordingly the tolerances, are descreased along with reduction in size of the gyroscope per se. As a result variations in temperature affecting the dimensions and fit of the parts have greater effect on performance. It has been found that a dashpot of conventional form provided with tolerances capable of satisfactory performance at say +100° F., will yield completely unsatisfactory performance at say −20° F. Consequently, uniformity of response of the damping means over the wide range of temperatures to which the same may be subjected on an aircraft has been heretofore unattainable.

A principal object of this invention is to provide viscous damping means for a gyroscope, e. g. a rate gyroscope, which provides uniform response over the entire temperature range to which the instrument may be subjected.

A further object is to provide viscous damping means as aforesaid which does not rely upon thermostatic devices for adjusting the damping rate in accordance with changes in temperature.

Other objects are to provide viscous damping means in accordance with the foregoing objects which is readily reproducible in quantity, which requires no calibration, is simple and capable of being embodied in the smallest size of unit without change in its fundamental attributes.

Additional objects of the invention will become apparent from the following description which, taken with the accompanying drawing, discloses a preferred mode of carrying the invention into practice.

Figure 1:
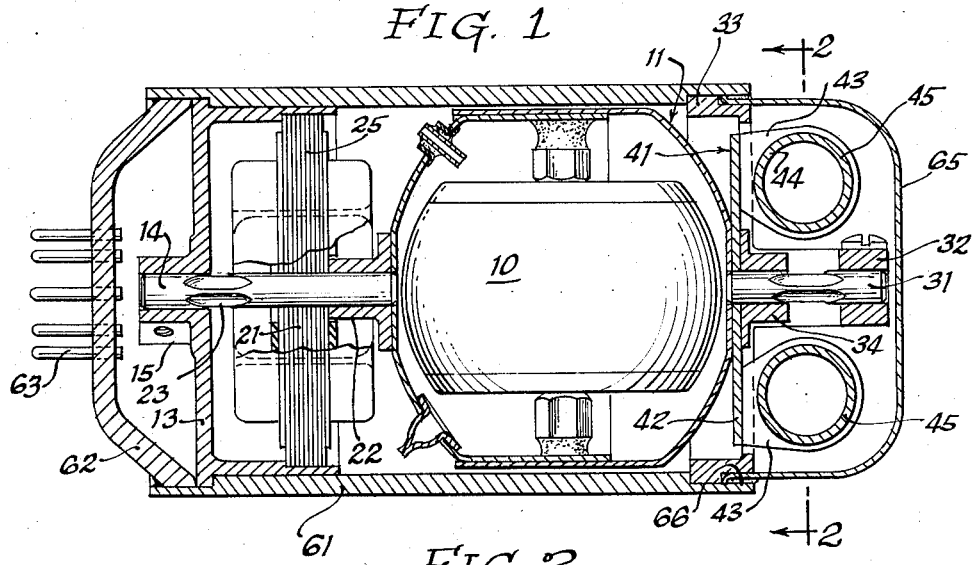
Fig. 1 is a cross sectional view longitudinally and substanitally medially, of a rate gyroscope embodying the viscous damping means of this invention.
Figure 2:
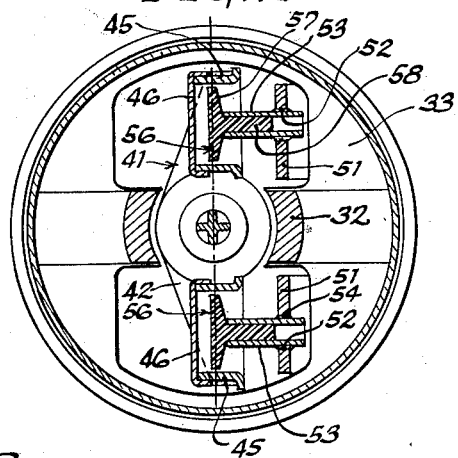
Fig. 2 is a cross section taken on the line 2—2 of Fig. 1.

Regarded broadly the invention, in one aspect, comprises the provision of one or more assemblies comprising a piston and cylinder, one of which is fixed and the other carried on the angularly displaceable gimbal supporting the gyroscope rotor. No pivots are employed but the parts are so arranged with respect to the axis of rotation of the gimbal that the small angular displacements corresponding to the minor departures of the airplane from its path are translated into virtually rectilinear relative movement of the piston and cylinder. Under these conditions binding is avoided by providing suitable annular clearance intermediate the piston and cylinder. The entire gyroscope, the damping assembly and other customary appurtenant parts, such as the electrical pickoff are encased hermetically and the voids filled with a suitable viscous fluid. Thus oscillatory movement of the gyroscope frame is translated into change in volume of the space defined in the cylinder by the piston, and the fluid then flows into or out of such space to provide, by fluid friction, the desired viscous damping. In another aspect the invention contemplates a combination of materials for the piston and cylinder so selected for their coefficients of expansion as to maintain, throughout the expected temperature range, a virtiually constant rate of transfer of fluid into and out of the dashpot space and which is attained by balancing the dimensions of the annular passage between the piston and cylinder against change of viscosity of the fluid. In another, but perhaps subsidiary aspect, the invention comprehends certain steps in assembly of the dashpots whereby to obtain response thereof in accordance with the principles of the invention.

The invention may be adapted to virtually any type of instrument wherein the viscous damping rate is preferably or necessarily to be maintained uniform over a range of temperatures which varies the viscosity of the damping fluid and thereby alters the amplitude of oscillatory response. In order to provide, for purposes of illustration, a typical environment I have shown the invention as embodied in a rate gyroscope in which the rotor 10 is supported in a frame or gimbal 11, in this case substantially in the form of a hollow sphere, hermetically sealed after being exhausted and re-filled with some inert gas, as is customary. At its left end the gimbal 11 is supported on a fixed frame member 13 through the medium of a so-called torsion bar 14 which is suitably clamped at one end in a hub 15 of the frame member 13. At its opposite end the bar 14 is secured in the rotor 21 of an electrical pickoff of any preferred type and also clamped or otherwise secured in the hub 22 forming part of the gimbal 11.

The torsion bar 14 may be of any suitable type designed to provide a mechanical restraint to the movement of the gimbal about its axis, for example, a cylindrical bar having a portion 33 of cruciform transverse cross section. The stator of the pickoff is indicated at 25. Thus any angular deviation of the gimbal 11 is equivalent to movement of the rotor 21 and provides a corresponding voltage from the pickoff, all as is understood by those in this art.

At the opposite end the gimbal 11 is supported on a similar torsion bar 31 clamped at one end in some suitable portion 32 of the fixed frame member 33, the other end being secured in a second hub 34 constituting par of the gimbal 11. Since the arrangement for supporting the gimbal as just described forms no part of the invention per se further elaboration will be dispensed with.

Affixed to the gimbal 11 is a bracket 41 including a plate 42 having a pair of outturned lips 43—43. Each lip 43 is provided with a cylinder 45 which may be drawn by means of a suitable punch and die or may be a short length of tubing press-fitted and maintained in a mating aperture by staking, crimping, brazing or otherwise. Closure of the cylinder may be accomplished by pressing a cap 46 thereover.

The frame 33 is provided with a pair of brackets 51—51, each having an aperture 52 for receiving with a loose fit, a metallic tube 53, the joint being effected preferably by cement 54 or other suitable means. However, I prefer a cement which remains reasonably plastic for a short period following its applicaction pending adjustment of the pistons with respect to the cylinders in a manner to be detailed hereinafter.

Into each of the tubes 53 a nylon piston 56 is fitted, the same including a head 57 and a shank 58 providing a press fit in the tube. If desired the tube may be crimped, as at 50, for greater security. It has been determined that, by employing nylon or some equivalent material having a similar coefficient of expansion for the piston and cold rolled steel or equivalent material for the cylinder wall the relative changes in dimensions due to temperature variation are such as to compensate for the change in viscosity of the fluid over that temperature range. It will be understood that the total angular excursion of the cylinders about the gimbal axis is on the order of only 4° to 8° so that the motion of the cylinders with respect to the pistons may, for all practical purposes, be regarded as linear. It will be obvious that the pistons may be made the movable part and the cylinders the fixed part without in any way changing their mutual function.

A cylindrical casing 61 surrounds and supports the several components just described, the ends thereof being suitably counterbored to receive the annular members 13 and 33. The left hand end carries an insulator 62 with which terminal prongs 63 are integrated. These latter serve the pickoff and motor driving the rotor 10. The opposite end of the instrument is provided with a cover or shell 65 set into a groove 66 and suitably sealed. Thus the interior of the instrument is hermetically sealed. Prior to closure by means of the cover 65 the voids are filled with a damping fluid of suitable viscosity, for example, silicone fluid #200, available from Dow Chemical Corporation, Midland, Michigan, it will be noted that the gimbal 11 has theretofore been filled with inert gas and sealed so that no damping fluid may interfere with rotation of the gyroscope rotor 10.

I have found that establishment of a uniform gap intermediate the piston and cylinder is of paramount importance for proper function of the invention damping arrangement. To attain this end novel steps are employed and as will now be explained.

Figure 3:
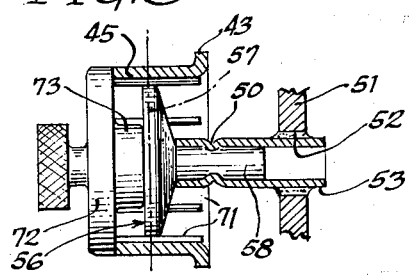
Fig. 3 is a detail view, in section, showing certain steps involved in the assembly of the invention.

Turing to Fig. 3 the piston 56 is located in the cylinder 45 and the gap between the same temporarily established by a suitable shim, for example, a plurality of cylindrical, gauging wires 71, in this case six in number, although as few as three would serve. For a cylinder 45 of cold rolled steel (SAE 1010) of deep drawing quality having an internal diameter of from 0.3121" to 0.3125" and a wall thickness of from 0.0309" to 0.0349" and a piston head 56 having a diameter of 0.3076" to 0.3080" gauging wires of 0.002 to 0.0025" diameter provide the necessary gap. A plug type of gauge 72 is provided with a projection 73 which acts to establish the relative axial location of the piston and floor of the cylinder when the gimbal is in its mid-position, namely, at 0° on some scale of reference and both bars 14 and 31 completely free of torsional deformation. Desirably the pistons are located so that a plane through the axis of the gimbal passes through the center of the periphery of each piston as measured axially of the piston.

Accordingly, with the parts assembled and located as shown in Fig. 3 a suitable cement is introduced between the tube 53 and aperture 52. If desired the cement may be applied to the tubes 53 prior to assembly. As noted heretofore a slow-setting cement is preferred to allow for necessary adjustments in the positioning of the parts. When the cement was hardened the gauge 72 and gauging wires 71 or equivalent shim are removed. Both pistons are adjusted concurrently. The assembly of the pistons with respect to the cylinders is preferably performed while the parts are maintained at some selected temperature within the anticipated operating range, preferably that temperature to which the instrument is expected to be subjected during the major portion of its operating time. The damping rate at that temperature using a specified damping fluid can be determined in its relation to a specific piston clearance. By virtue of the principles of the invention it will be found that the damping rate does not vary noticeably at operating temperatures above or below the selected value.

While I have shown a particular embodiment of my invention, it will be understood, of course, that I do not wish to be limited thereto since many modifications may be made and I therefore contemplate by the appended claims to cover any such modifications as fall within the true spirit and scope of my invention.

I claim:

1. In a rate gyroscope or like organization in which viscous damping is provided for angular oscillations of limited amplitude of a movable element over a range wherein $\sin \theta$ substantially equals $\theta$ and about an axis fixed with reference to a frame the combination which comprises a right circular cylinder fixed to one of the element and frame and a piston fixed to one of the frame and element, as the case may be, for relative movement of said piston and cylinder, said piston having a mean position corresponding to zero of angular displacement in which the center of the periphery of the piston, measured axially, lies in a plane through the axis of displacement, means for encasing the cylinder and piston to form a sealed chamber therearound, damping fluid filling said chamber, said piston having a predetermined annular clearance in said cylinder for displacement of fluid from one side of the piston to the other.

2. In a rate gyroscope or like organization in which viscous damping is provided for angular oscillations of limited amplitude of a movable element over a range wherein $\sin \theta = \theta$ and about an axis fixed with reference to a frame the combination which comprises a thin-walled, steel cylinder fixed to one of the element and frame, a nylon piston for movement with respect to said cylinder fixed to one of the frame and element, as the case may be, said piston having a cylindrical portion fitting said cylinder with a predetermined annular clearance therebetween, the center of said portion measured axially coinciding with a diametrical plane through the axis when the movable element is in its zero position, means for encasing the cylinder and piston to form a sealed chamber therearound, damping fluid filling said chamber, whereby relative movement of said piston and cylinder displaces fluid from one side of the piston to the other.

3. In a rate gyroscope or like organization in which viscous damping is provided for angular oscillations of limited amplitude of a movable element over a range wherein $\sin \theta$ is substantially equal to $\theta$ and about an axis fixed with reference to a frame the combination of which comprises a steel cylinder fixed to one of the element and frame and a nylon piston fixed to one of the frame and element, as the case may be, for relative movement of said piston and cylinder, means for encasing the cylinder and piston to form a sealed chamber therearound, damping fluid filling said chamber, said piston having a predetermined annular clearance in said cylinder for displacement of fluid from one side of the piston to the other, and said cylinder and piston respectively comprise material having temperature coefficients of expansion such that the said annular clearance will have a substantially constant effective area to produce a substantially constant rate of transfer of damping fluid into and out of said cylinder upon movement of said piston over the range of temperature to which the instrument is subjected during use.

References Cited in the file of this patent

UNITED STATES PATENTS

| | | |
|---|---|---|
| 1,330,501 | Tanner | Feb. 10, 1920 |
| 1,407,320 | Bouche | Feb. 21, 1922 |
| 2,013,109 | Reynolds | Sept. 3, 1935 |
| 2,291,612 | Draper | Aug. 4, 1942 |
| 2,544,767 | Reid | Mar. 13, 1951 |
| 2,709,921 | Sylvan | June 7, 1955 |

FOREIGN PATENTS

| | | |
|---|---|---|
| 387,366 | Great Britain | Jan. 30, 1933 |